Oct. 19, 1965  J. T. KUTNEY  3,212,733
CRUISE FAN COUPLING SYSTEM
Filed July 30, 1964
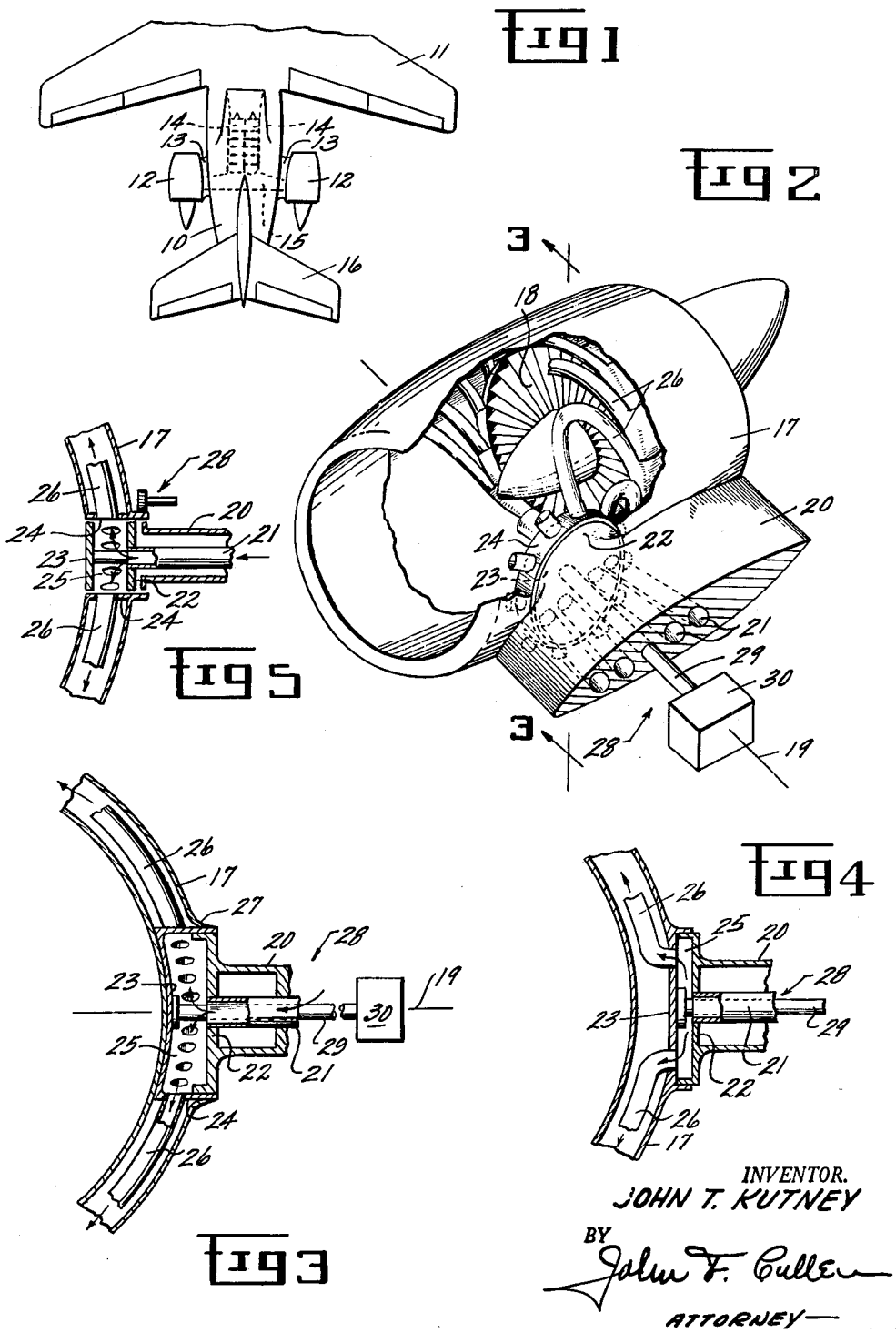
INVENTOR.
JOHN T. KUTNEY
BY
John F. Cullen
ATTORNEY

United States Patent Office 3,212,733
Patented Oct. 19, 1965

3,212,733
CRUISE FAN COUPLING SYSTEM
John T. Kutney, Cincinnati, Ohio, assignor to General
Electric Company, a corporation of New York
Filed July 30, 1964, Ser. No. 386,294
8 Claims. (Cl. 244—54)

The present invention relates to a coupling system and, more particularly, to a coupling system as used in an aircraft of the type having cruise fans in nacelles and rotatable with respect to the aircraft for vertical takeoff and cruise.

In large aircraft it has become customary to consider the cruise fan as an attractive propulsion system because of its desirable operating characteristics such as good thrust capabilities and low specific fuel consumption. A cruise fan may be a tip turbine type employing large fans with tip turbine buckets around the periphery thereof, the whole being mounted in a nacelle and the fan being driven from scroll means feeding the tip turbine buckets. The scroll in turn may receive its exhaust gas driving fluid from remotely placed exhaust gas generators such as jet engines. The advantage of the remotely located gas generators is the ability to direct the flow where desired such as to cruise fans.

For various reasons that are well known, such as safety in case of engine failure, it is also desirable to use common ducting in certain applications. In such an arrangement a common duct may feed a cruise fan on each side of the fuselage and a central gas generator may feed the common duct. One of the difficulties encountered is that the mass flow of exhaust gas from some gas generators is so much that a very large pipe is required to carry the driving fluid to the cruise fan. A typical installation of such rotating cruise fan devices is shown in United States Patent 3,033,492 wherein the details of a particular rotatable cruise fan arrangement are shown. A more general arrangement is shown in United States Patent 3,038,683. These patents clearly show the relatively large pipe necessary to carry the exhaust gases to the cruise fans.

Because the pipe necessary to accommodate the mass flow assumes relatively large proportions it can become completely unacceptable from an aerodynamic standpoint by offering too much air resistance and high drag. It is customary to mount the external appendages such as engines by means of airfoil shaped pylons because they offer low resistance. Typically, to be aerodynamically acceptable, it is a general rule that the ratio of the thickness of the pylon to its length or chord should be in the neighborhood of 6% to 10%. Above that, the drag becomes prohibitive. With large gas generators and consequently, large mass flows, it is impossible to maintain such a ratio within reasonable limits and still use a pipe large enough to carry the mass flow. Maintaining the ratio would then require a pylon so long as to be unacceptable.

It is possible to split the flow from the gas generators into many smaller ducts in place of one large pipe but, in those applications where the cruise fan is to rotate for VTOL or STOL missions it becomes difficult to provide a coupling arrangement that permits this operation.

The main object of the present invention is to provide a coupling system for use with rotatable cruise fans which dispenses with large single pipe ducting.

A further object is to provide such a system that employs a plurality of small ducts in combination with a plenum chamber that permits rotation of the cruise fan and change of position relative to the aircraft.

A further object is to provide such a coupling system with the structural details to give an acceptable aerodynamic shape and still maintain the rotatable function required.

Still a further object is to provide such a system utilizing a novel plenum chamber which is partially rotatable and from which the cruise fan receives its driving fluid.

Briefly stated, the invention is directed to the structure that permits the use of a plurality of small ducts in place of one large pipe for carrying the driving fluid. It comprises a coupling system that connects a rotatable cruise fan to its aircraft through an airfoil shaped pylon fixed to the aircraft and which has a plurality of exhaust gas ducts in side-by-side relation extending lengthwise of the pylon to a remote gas generator. The pylon is provided with a fixed surface at its outer end and this surface contains the ends of the exhaust gas ducts. A wall surface preferably within the fan nacelle is spaced from the fixed surface and a wall means encloses the space between the surfaces to form a plenum chamber. A plurality of fan ducts terminates in one of the walls in the plenum chamber and feeds the cruise fan at the other ends of the ducts. Means are provided to rotate the wall with the fan ducts therein about a longitudinal axis in the pylon to change the position of the fan relative to the aircraft. Additionally, the invention points out specific walls which contain the fan ducts and provides symmetrical feeding of opposite sides of the fan periphery by the ducts.

While the specification concludes with claims particularly pointing out and distinctly claiming the subject matter which is regarded as the invention, it is believed the invention will be better understood from the following description taken in connection with the accompanying drawings in which:

FIG. 1 is a partial plan view of an aircraft employing cruise fans of the conventional type illustrating the application;

FIG. 2 is a partial perspective view illustrating one modification of the instant invention;

FIG. 3 is a partial cross-sectional view on line 3—3 of FIG. 2;

FIG. 4 is a partial cross-sectional view similar to FIG. 3 showing a modification; and FIG. 5 is a partial cross-sectional view of another modification of the FIG. 3 type.

Referring first to FIG. 1, there is shown a general view of a conventional aircraft having a fuselage 10 with the customary wings 11 thereon with all the normal appendages as is well known or possibly using lift fans in the wing structure also well known. In order to propel the aircraft, it is, for descriptive purposes herein, equipped on the fuselage generally at the aft end, with a pair of oppositely disposed cruise fans 12 that are supported by a suitable structure 13 that may form the bearing as well as a pipe carrying exhaust gases to cruise fans 12. The driving fluid may be supplied by a remote gas generator 13 of one or more jet engines that feeds a common duct 15. Finally, the whole aircraft is equipped with a conventional aircraft tail unit 16. The details of such propulsion systems are explained in more detail in the aforementioned patents.

Because the usual tip turbine cruise fan utilizes all the output of the gas generator it requires a lot of duct work in order to carry the exhaust gas fluid to the scroll directing the driving gases to the tip turbine. Directing all of this exhaust gas fluid through a single support structure such as pipe 13 requires a very large pipe in order to handle the mass of fluid required. This results in high drag and unacceptable performance. It has been proposed to split pipe 13 into numerous small pipes but this creates problems on how to rotate the cruise fans 12 during off-cruise operation.

Referring next to FIG. 2, the details of the invention to permit this rotation to take place will be explained. In the description herein it will be understood that nacelle 17 housing a fan 18 comprises a cruise fan similar to 12 in FIG. 1. It is desired that the whole nacelle 17 be rotated about a longitudinal axis 19 so that VTOL or STOL operation may be obtained. To this end, fuselage 10 is provided with a pylon 20 that is fixed to the aircraft and through which axis 19 passes as shown. Pylon 20 is in the shape of an airfoil and generally maintains a thickness to chord ratio of 6% to 10%. With such ratio it is aerodynamically acceptable and the drag may be kept to a minimum. The fans 18 are connected to the remote gas generator through the coupling system to be described. In order to carry the mass flow needed by the fan, a plurality of exhaust gas ducts 21 are disposed in the pylon side-by-side as shown and they extend substantially lengthwise in the pylon to be connected at one end to the exhaust gas generator. Because of the plurality of pipes thus provided, it is necessary to have some innerconnecting or coupling arrangement to permit rotation. To achieve this there is provided a fixed surface 22, that may generally be circular as shown in FIG. 2, and this is connected to the outer end of the pylon in much the manner of a flange so that it extends radially outward of the pylon. The plurality of exhaust gas ducts 21 are terminated in surface 22 so that the surface contains the ends of these ducts. The structure thus far described is fixed with respect to the aircraft and pylon.

In order to provide the rotation structure necessary, a matching wall surface 23, generally circular in configuration, is provided preferably in the nacelle and this surface is spaced from the fixed surface 22 a given distance. It is to be noted that this surface 23 may be separate and connected to the nacelle or it may form part of the nacelle structure as shown in FIG. 3 or, alternately, it may be fixed by means not shown to surface 22 to form part of the fixed surface as shown in FIG. 5. Which way the wall 23 is fashioned depends on the modification chosen and installation characteristics.

In order to enclose the space thus provided between surfaces 22 and 23 there is provided a ring wall means 24 which is nothing more than a hoop surrounding the space between the two surfaces and to form with them a plenum chamber as shown or compartmented if a smaller plenum is desired.

For carrying the driving fluid or exhaust gas that occupies plenum chamber 25 as supplied by exhaust gas ducts 21, there is provided a plurality of fan ducts 26 that may be directed to discrete arcuate scroll segments about fan 18. Such an arrangement is the subject of applicant's co-pending application Serial No. 386,295, filed concurrently with the instant application.

Reference to FIG. 2 shows that these fan ducts 26 are each separately and peripherally spaced and are directed to and connected to ring wall 24 to terminate therein. In effect then, ducts 26 substantially radiate from the ring wall as shown in FIG. 2 and FIG. 3. Thus far, it will be apparent that the exhaust gas from ducts 21 charges the plenum chamber 25 which in turn feeds fan ducts 26 to drive the fan 18.

It may be preferable, as shown in FIGS. 2 and 3, to have ring wall 24 and matching wall surface 23 connected together in which case the wing wall then becomes a mere extension of wall 23 as shown in FIG. 3. Alternately, if wall surface 23 is fixed to surface 22 as described above, ring wall 24 may be disconnected therefrom and may be rotatable relative to both surfaces 22 and 23 as part of the nacelle structure as shown in FIG. 5. These are mere modifications depending on the particular installation.

In order for the proper rotation to take place, it will be apparent that the plenum chamber structure is disposed at one side of the fan nacelle facing the fuselage or pylon as shown. The plenum-duct structure is shown exaggerated in size for clarity and the whole structure thus far described may be included within a relatively narrow extension of the nacelle so that it forms no more than a small clean bump or bubble on the nacelle which is acceptable aerodynamically. Thus, it is possible to provide fairing 27 between the end of the pylon 20 and the nacelle so as to cover ring wall 24 and the fan ducts.

In order to provide rotation about axis 19 for vertical operation, rotating means 28 extends through the pylon and connects to one of the movable walls such as wall surface 23 as shown in FIGS. 2 and 3. Any suitable structure not forming part of the invention herein may be used for rotation. Typically, this may be a fixed shaft arrangement shown at 29. Shaft means 29 may be driven by a motor 30 to change the position of the fan relative to the aircraft as will be understood. With the structure described, it will be apparent that fan ducts 26, by radiating from ring wall 24 around the periphery of the ring wall permit half of the fan ducts to be brought to one side of the periphery of fan 18 and the other half of the fan ducts 26 may be symmetrically taken around the nacelle to feed the opposite side of the fan periphery as generally shown in FIG. 2. This permits a thin nacelle wall to be maintained as more clearly described in said co-pending application.

Referring next to FIG. 4, a modification is shown wherein fan ducts 26 may be taken off of and terminate in wall surface 23 instead of ring wall 24. In this modification, the fan ducts 26 would normally be disposed symmetrically one set above the other as shown, each set feeding half of the fan periphery in much the manner disclosed in connection with FIG. 2. Suffice to say, the wall containing the outlet of fan ducts 26 must be the one that rotates. In FIGS. 2 and 3 this is ring wall 24 and in FIG. 4 this would be wall surface 23. This rotating wall containing the outlet of fan ducts 26 must, of necessity, be part of the nacelle structure.

Further, as noted above, the wall surface 23 may be fixed with respect to surface 22 and rotate therewith as shown in FIG. 5. In this case, ring wall 24 as part of the nacelle will rotate about the surfaces 22 and 23. Rotating means 28 may take a different form as shown.

While not shown, it will be obvious that suitable bearing and sealing means must be provided at the coupling structure but such details form no part of the present invention.

It will be apparent that the modifications shown provide for the use of a relatively thin aerodynamically acceptable pylon and plenum chamber coupling system between the pylon and cruise fan that permits rotation of the fan without the use of a large diameter duct. The coupling structure necessary is such that it may be contained within a small bubble or bump at one side of the nacelle and fairing satisfactorily accommodates the entire coupling system. All the structure is thus completely enclosed within an aerodynamically smooth nacelle structure and rotation is permitted as required.

While there have been described preferred forms of the invention, obvious modifications and variations are possible in light of the above teachings. It is therefore to be understood that within the scope of the appended claims, the invention may be practiced otherwise than as specifically described.

I claim:
1. In an aircraft of the type having cruise fans in nacelles and rotatable with respect to the aircraft for vertical take off and cruise, a coupling system connecting said fans to the aircraft comprising,
    an airfoil shaped pylon fixed to the aircraft,
    a plurality of exhaust gas ducts disposed side-by-side and extending substantially lengthwise in the pylon,
    a fixed surface at one end of the pylon and containing the ends of said ducts,
    a wall surface within the fan nacelle and spaced from said fixed surface,
    wall means enclosing the space between said surfaces to form a plenum chamber with said surfaces,
    a plurality of fan ducts in one of said walls, said ducts terminating in the plenum chamber and feeding the fan, and means to rotate at least said wall with the ducts therein about a longitudinal axis in said pylon to change the position of said fan relative to said aircraft.

2. Apparatus as described in claim 1 wherein the wall means is rotatable and the fan ducts therein substantially radiate therefrom, said wall means being disposed at one side of the fan nacelle and having fairing between said nacelle and pylon.

3. Apparatus as described in claim 1 wherein the wall means and wall surface are both rotatable and connected together and said fan ducts radiate from said wall means, and fairing between said nacelle and pylon covering said fan ducts.

4. Apparatus as described in claim 1 wherein said wall means is an extension of said wall surface and connected thereto and said wall means has fan ducts substantially radiating from its periphery, half said fan ducts feeding one side of the periphery of said fan and the other half of said fan ducts symmetrically feeding the opposite side of the fan periphery.

5. In an aircraft of the type having cruise fans in nacelles and rotatable with respect to the aircraft for vertical take off and cruise, a coupling system connecting said fans to the aircraft comprising, an airfoil shaped pylon fixed to the aircraft fuselage and extending therefrom, a plurality of exhaust gas ducts disposed side-by-side and extending lengthwise in the pylon, a fixed circular surface connected to the outer end of the pylon and extending radially outward of the pylon and containing the ends of said ducts, a matching circular wall surface in said nacelle and connected thereto and spaced from said fixed surface, a ring wall enclosing the space between said surfaces to define a plenum chamber, a plurality of fan ducts each separately spaced and connected to and extending from one of said walls to terminate in said plenum chamber at said connected end and feed said fan from the other end, and means extending through said pylon and connected to said wall with the ducts therein and nacelle connected to rotate said wall and nacelle about a longitudinal axis in said pylon to change the position of said fan relative to said aircraft.

6. Apparatus as described in claim 5 wherein said ring wall is rotatable by said extending means, and the fan ducts in said ring wall substantially radiate therefrom, said ring wall being disposed at one side of the fan nacelle and said nacelle fairing into said pylon over said ring wall.

7. Apparatus as described in claim 5 wherein the ring wall and matching wall surface are both connected and rotatable by said extending means connected to said ring wall, and said fan ducts radiate from said ring wall, and fairing between said nacelle and pylon covering said ring wall.

8. Apparatus as described in claim 5 wherein said ring wall is an extension of said matching wall surface and is connected thereto and to said extending means and said ring wall has fan ducts substantially radiating from its periphery, half said fan ducts feeding one side of the periphery of said fan and the other half of said fan ducts symmetrically feeding the opposite side of the fan periphery.

References Cited by the Examiner

UNITED STATES PATENTS

| | | | |
|---|---|---|---|
| 3,033,492 | 5/62 | Rowe | 244—23 |
| 3,038,683 | 6/62 | Rowe | 244—12 |

FERGUS S. MIDDLETON, *Primary Examiner.*